Patented Apr. 23, 1929.

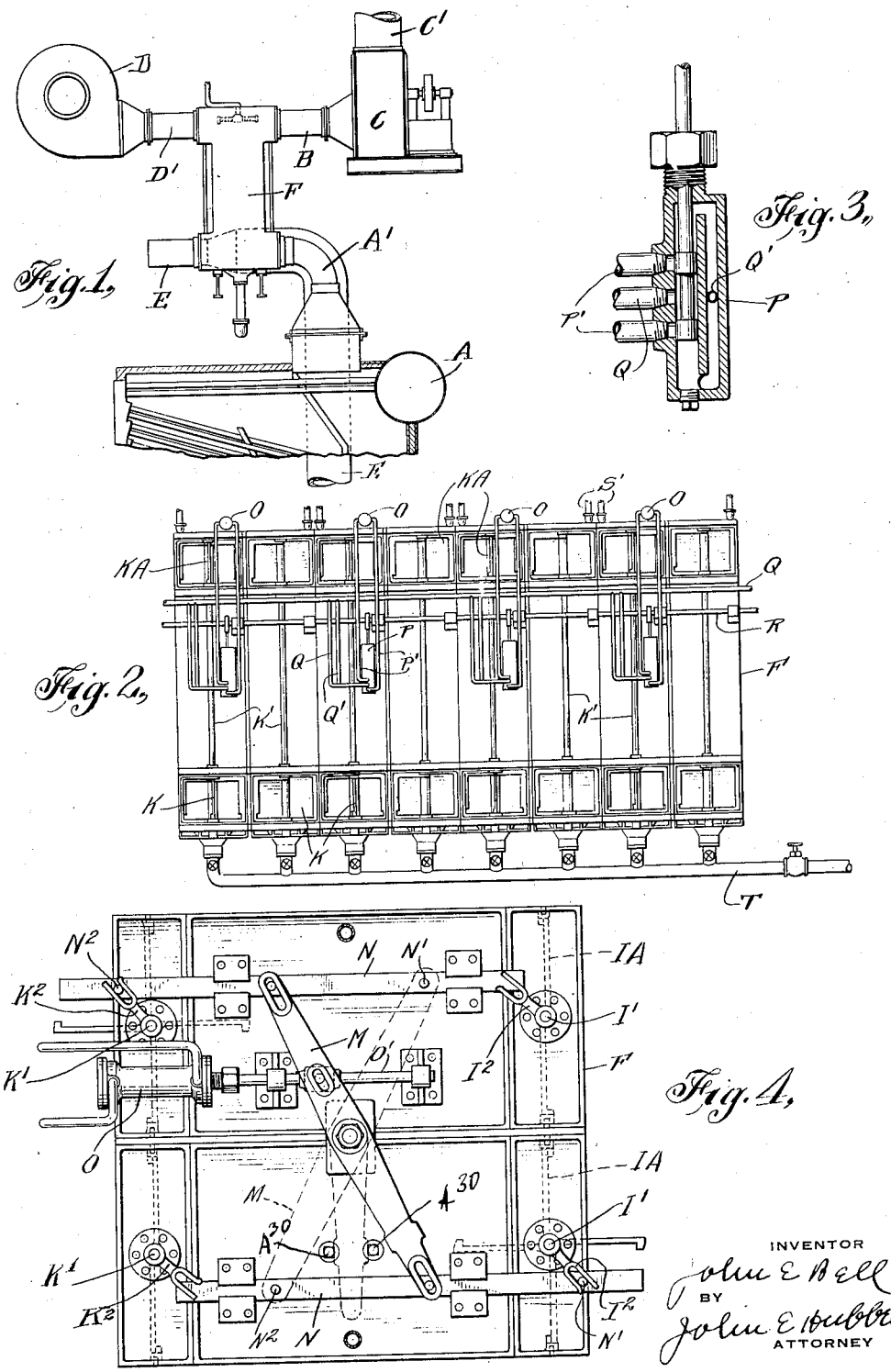

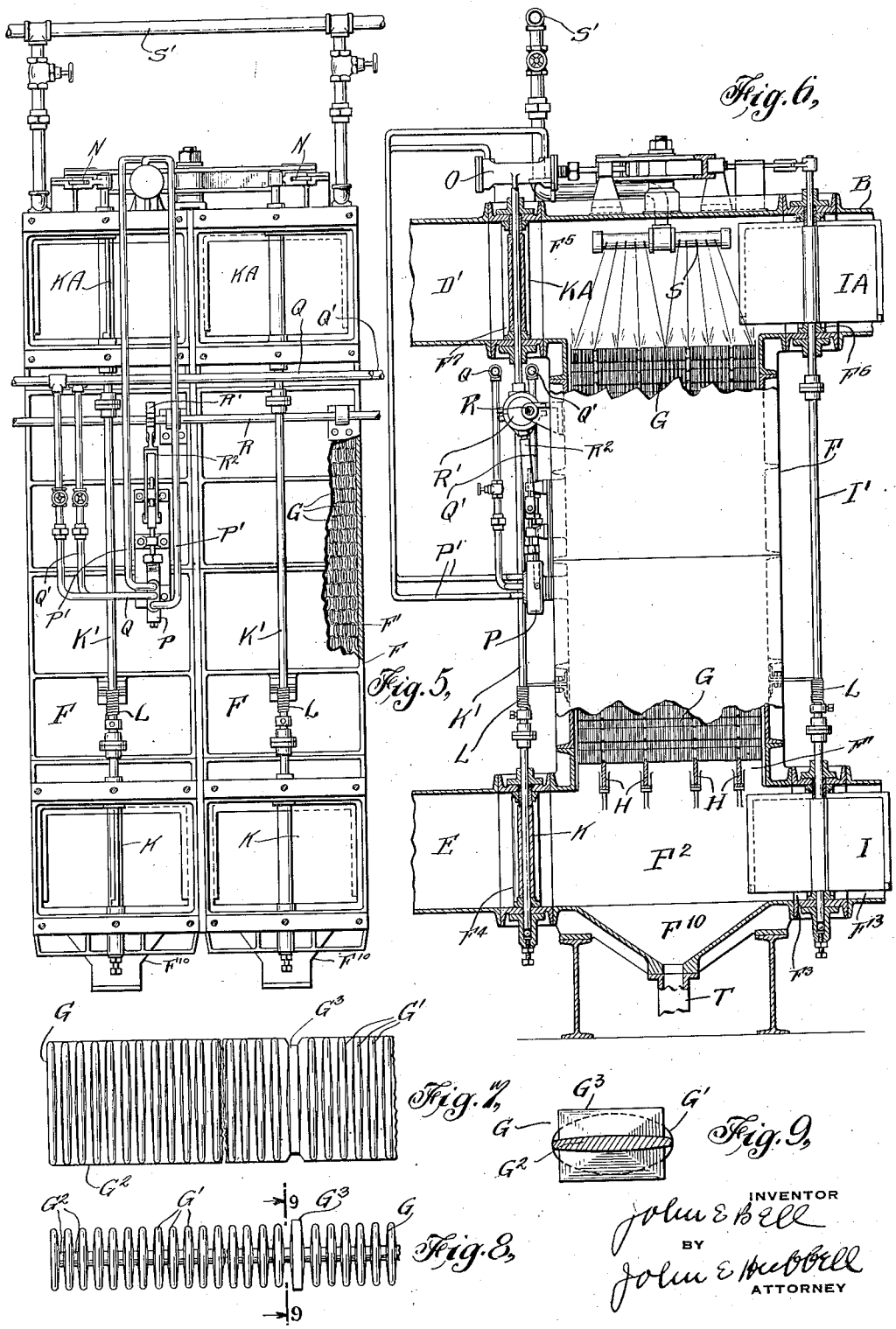

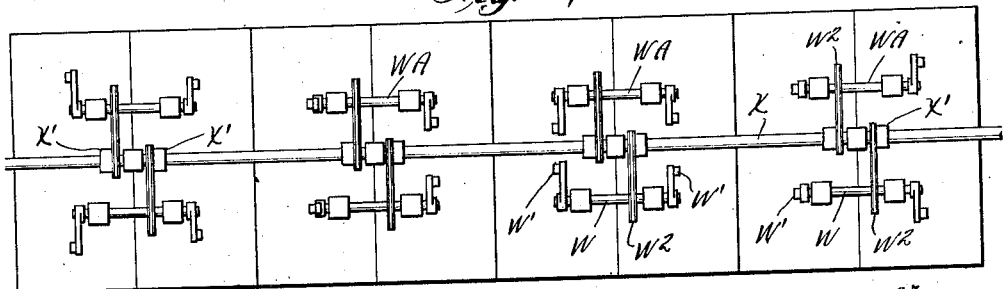
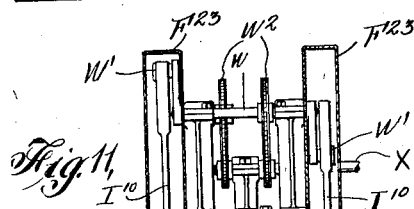
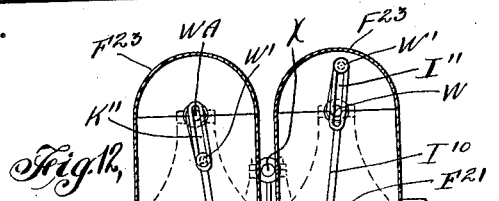
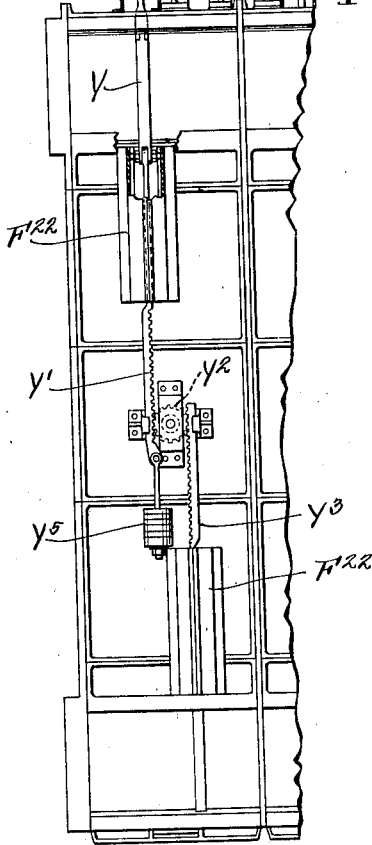
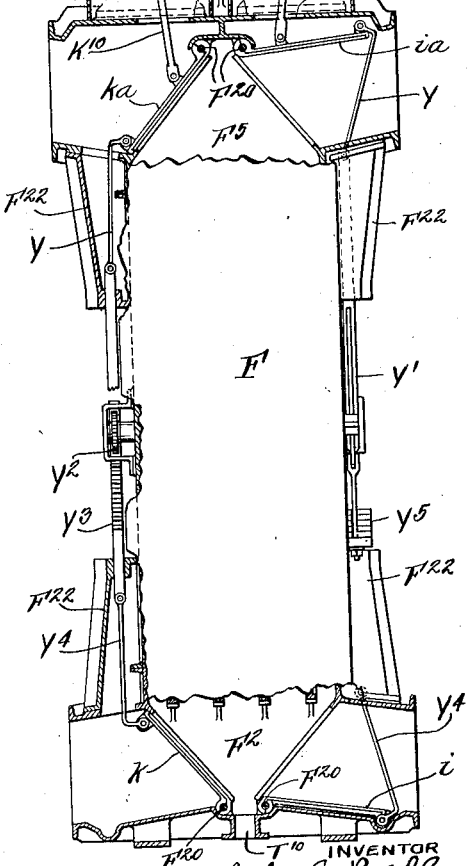

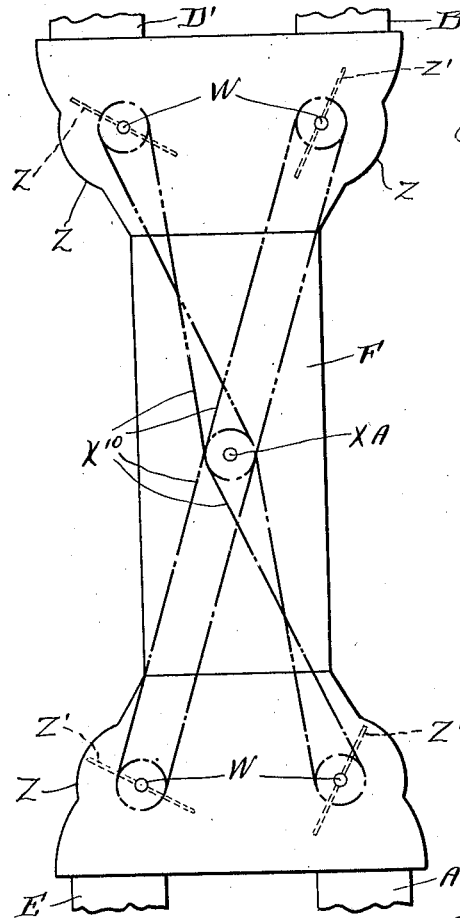
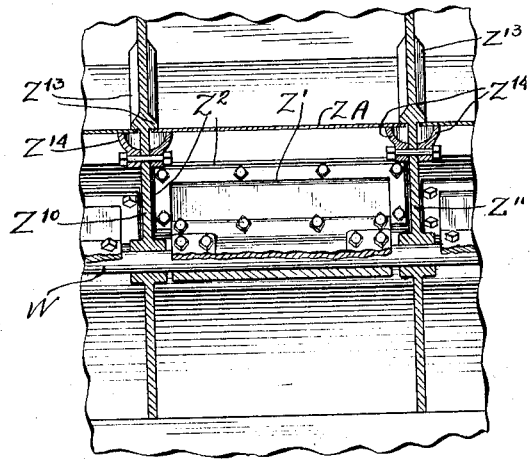
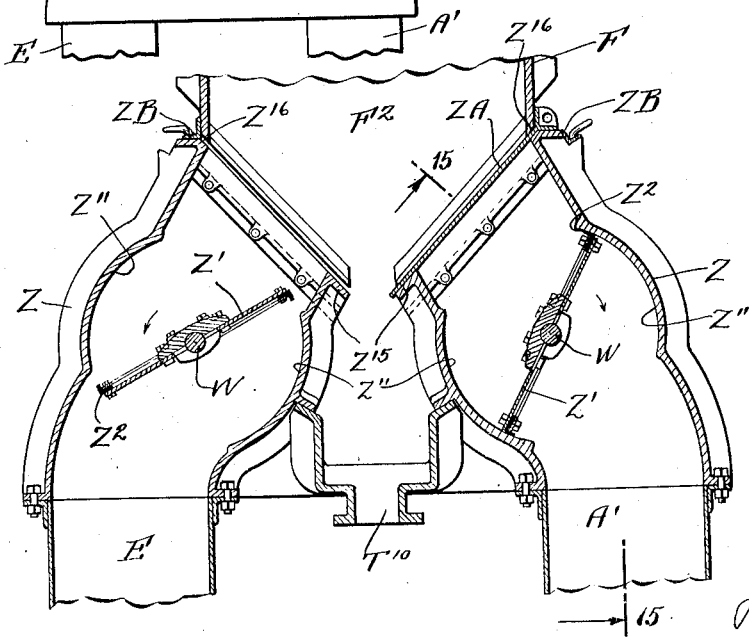

1,710,529

UNITED STATES PATENT OFFICE.

JOHN E. BELL, OF BROOKLYN, NEW YORK, ASSIGNOR TO FOSTER WHEELER CORPORATION, OF NEW YORK, N. Y., A CORPORATION OF NEW YORK.

REGENERATIVE AIR HEATER.

Application filed January 30, 1924. Serial No. 689,443.

The general object of my present invention is to provide improved means for effecting a heat transfer between two fluids, and my invention was primarily devised and is especially adapted for use in preheating the air for combustion supplied to boiler furnaces with heat absorbed from the flue gases leaving the boiler furnace proper.

The utilization of heat in the flue gases leaving the boiler proper in preheating the air used in combustion in the boiler furnace is now not uncommon practice, and the tendency of present day power plant engineering is to make this practice of increasing desirability, particularly when the boiler feed water is wholly or largely heated by steam bled from the lower pressure stages of the plant turbines, as in such case economizers cannot be employed with advantage. Air preheaters for power plants now in use operate upon the recuperative, as distinguished from the Siemens's regenerative principle, and are ordinarily in the form of structures comprising metal plates or tubes defining the separate passages for the air to be preheated and for the stack gases which transfer heat to the air through the walls of such passages. Air preheaters operating on the recuperative principle are inherently bulky and relatively expensive to construct, and are difficult to clean, which is a matter of prime practical importance because of the inevitable deposit of soot and other furnace dust in the passages traversed by the heating gases.

In accordance with the present invention, I preheat air in accordance with the Siemens's regenerative principle; i. e. by means of a heat absorbing and dispensing structure which is swept alternately by the air to be preheated, and by the boiler heating gases passing to the stack. While the Siemens's regenerator is an old and well known device, which is now and long has been extensively used in preheating air for combustion in coke ovens, and in open hearth and other industrial furnaces, the adaptation of such a device for effective use in preheating the combustion air supplied to boiler furnaces presents certain novel problems particularly because of the relatively low temperatures at which the gases supplying heat to the regenerators enter the latter and the necessity of avoiding undesirable draft and temperature disturbances in the operation of the boiler furnaces, and the necessity for obtaining the desired regenerative effect with apparatus relatively small in bulk and inexpensive to manufacture.

In accordance with the present invention, I take advantage of the relatively low maximum temperature of the heating gases entering the regenerator by employing a heat absorbing and dispensing material, which is preferably cast iron and is of high heat conductivity as compared with the fire bricks employed in ordinary Siemen's regenerators, and I preferably form the regenerative structure of units of a special shape which minimizes the weight and bulk of the regenerative structure required for a given heat transfer effect and which also minimizes and standardizes the friction draft loss in the regenerator and facilitates the assembly and cleaning of the latter. To make effective use of the regenerative material and structure which I employ, I provide for a much more frequent reversal of the flow through the regenerative chambers than occurs in ordinary Siemen's regenerators, and preferably divide the regenerator for each boiler furnace plant into a plurality of regenerator units or sections, and reverse the flow through different units at different times, whereby the draft disturbance due to the reversal of the flow in any one unit of the regenerator is minimized, and fluctuations in the temperature of the preheated air delivered, resulting from flow reversal through the regenerator sections, are minimized.

My invention is further characterized by the provisions made for washing the heat absorbing and dispensing surfaces of the regenerator with water at suitably frequent intervals, to thereby remove deposited soot or other furnace dust and thus maintain the regenerator in a condition of approximately maximum heat transfer efficiency.

The various features of novelty which characterize my invention are pointed out with particularity in the claims annexed to and forming a part of this specification. For a better understanding of the invention, however, its advantages, and specific objects obtained with its use, reference should be had to the accompanying drawings and descriptive matter, in which I have illustrated and described a preferred embodiment of my invention.

Of the drawings:—

Fig. 1 is a diagrammatic elevation showing a portion of a boiler furnace equipped with my invention;

Fig. 2 is an elevation taken, at right angles to Fig. 1, of the regenerative air heater proper;

Fig. 3 is a sectional elevation of a control valve;

Fig. 4 is a plan view of a portion of the regenerator;

Fig. 5 is a side elevation of the portion of the regenerator shown in Fig. 4;

Fig. 6 is an elevation taken at right angles to Fig. 5 and partly in section;

Fig. 7 is an elevation; and Fig. 8 is a plan of one of the regenerative elements;

Fig. 9 is a section on the line 9—9 of Fig. 8;

Fig. 10 is a diagrammatic plan view of a regenerator having a modified form of valve mechanism;

Fig. 11 is a side elevation of the generator shown in Fig. 10;

Fig. 12 is a section taken transversely to Fig. 11;

Fig. 13 is a somewhat diagrammatic end elevation of a regenerator having another valve arrangement;

Fig. 14 is a partial section taken parallel to the plane of Fig. 13; and

Fig. 15 is a partial section on the broken line 15 of Fig. 14.

In the use of my invention illustrated diagrammatically in Fig. 1, A represents a boiler furnace and A′ the heating gas outlet therefrom. Located directly above the boiler furnace is a regenerator F, which receives heating gases from the boiler furnace through the outlet connection A′ and delivers these gases through the conduit B to the draft creating device, which, as shown, comprises an exhaust fan C and a stack outlet connection C′. The air to be preheated is supplied to the regenerator F through a conduit D′ by a blower D, and the air preheated in the regenerator passes to the combustion chamber (not shown) of the boiler furnace through the connection E.

The regenerator F as shown, is divided into a plurality of regenerator units or sections, each of which comprises a chamber F′, in which a mass of the regenerative devices G proper are stacked, and terminal chambers $F^2$ and $F^5$ at the bottom and top, respectively of the chamber F′. Each terminal chamber $F^2$ is connected at one side by a port $F^3$ to the boiler flue gas outlet A′ and at the opposite side is connected by a port $F^4$ to the hot air conduit T. Each chamber $F^5$ is connected to the conduit B through a port $F^6$ at one side of the chamber, and at the opposite side of the chamber is connected to the outlet D′ of the blower D by a port $F^7$. The port $F^3$ is controlled by a butterfly valve I and the port $F^6$ is controlled by a similar valve IA. The two valves I and IA of each regenerator section are each rigidly secured to the same vertical valve shaft I′. The ports $F^4$ and $F^7$ of each regenerator unit are controlled by valves K and KA respectively, carried on a valve shaft K′. The shaft K′ and valves K and KA may be identical in construction and arrangement with the valve shaft I′ and the valves I and IA respectively.

In the construction illustrated in Figs. 1–6, the various regenerator units are arranged in pairs in such fashion that the flow through the two units of each pair is always in opposite directions. This means that the direction of flow is simultaneously reversed in the two units of each pair. Preferably, and as shown, the direction of flow through the various pairs of regenerator units is reversed successively at regular intervals. The provisions shown in Figs. 1–6, for reversing the direction of flow through the various regenerator sections comprise a single valve actuating lever M for each pair of sections in which the flow is simultaneously reversed and a separate motor O for operating each valve lever M, and control mechanism for energizing the different motors O successively at regular intervals. As shown, the motors O are fluid pressure cylinders, the piston stem O′ of each motor being connected by a pin and slot connection to the corresponding lever M, so that on each movement of the piston of the motor from one end to the other of its range of movement, the lever M will be moved in one direction or the other between the full and dotted line positions shown in Fig. 4. Each lever M is connected at each end by a pin and slot connection to a reciprocating bar N. One of the two bars N, reciprocated by each lever M, operates the valves I, IA, K and KA of one, while the other bar N operates the corresponding valves of the other of the two regenerator units to which the lever M pertains. Each bar N is mounted in suitable guides, carried by the top of the regenerating housing, and is provided with valve actuating pins N′ and $N^2$ which reciprocate the arms $I^2$ and $K^2$ respectively, secured to the upper ends of the corresponding valve shafts I′ and K′. The pins N′ and $N^2$ and arms $I^2$ and $K^2$ are so relatively arranged that when any bar is moved to the right, as seen in Fig. 4, in response to the corresponding motion of the lever M, the initial movement of the bar N closes the corresponding valves K and KA without moving the corresponding valves I and IA, which, however, are opened by the further movement of the bar N. On the return movement (to the left) of the bar N, the corresponding valves I and IA are first closed and then the corresponding valves K and KA are opened. For this purpose the ends of the arms I² and K² are bifurcated, and the inner prong of the bifurcated end of each arm I² and K² is shortened so that the corresponding bar pin N' or N² moves out of contact with each arm after the latter has been moved into the valve closed position, but is received in the space between the two prongs of the arm, and thus positively controls the corresponding valves, when the latter are out of their closed positions. Each of the valve shafts I' and K' is encircled by a coil spring L, which has one end attached to the shaft and the other attached to the regenerating housing, and tends to hold the corresponding valves in their closed positions.

With the described arrangement, the direction of flow is always in opposite directions through the two units to which each lever M and motor O pertain except at the instants when the lever M is in its intermediate position, and then both sets of valves I, IA, K and KA are closed and there is no flow in either direction through either regenerator unit. In consequence, there can never be a direct flow of air from the blower outlet D' into the stack, or a direct flow of flue gases from the boiler outlet A' into the air supply conduit E.

A sequential reversal of flow in the different pairs of regenerator units is obtained in the apparatus shown by means of a common control shaft R which may rotate continuously at a suitable slow speed or may be rotated intermittently at regular intervals in suitable angular steps by a suitable motor or control mechanism (not shown).

The control shaft R carries a series of eccentrics R' angularly displaced from one another about the axis of the shaft R, and each connected by an eccentric strap or yoke R² and connecting rod to a corresponding control valve P. Each valve P is connected to the ends of the corresponding motor cylinder O by pipes P' and to fluid pressure supply piping Q and exhaust piping Q' in such fashion that on each actuation the valve P connects one end of the cylinder O to the supply piping Q and simultaneously connects the other end of the cylinder to the exhaust pipe Q'. The valves P may be, as shown in Fig. 3, similar to the steam valves of simple steam engines, and hence their construction need not be described. The piping Q may supply any suitable operating fluid, but in ordinary practice I prefer that the fluid supplied should be water rather than steam or air.

The regenerative devices G are advantageously of the special construction illustrated in Figs. 7, 8 and 9. As shown in these devices, each device G is formed of cast iron and may be regarded as composed of a plurality of parallel elliptical disks G' connected by neck or web portions G², and a plurality of spacing blocks G³ distributed along the length of the device. The spacing blocks G³ are rectangular in outline and so proportioned that in the stack of devices G in each regenerator unit, the blocks G³ in each upper row of devices G rest directly upon the spacing blocks G³ of the subadjacent row of devices. When the disks G' are elliptical, as shown and as I consider preferable, they are arranged with the major axes of the ellipses in a vertical position, and the devices G in adjacent horizontal rows are staggered so that the webs G² of devices G in the adjacent rows are laterally displaced (see Fig. 5).

To remove soot, ashes or other furnace dust accumulating in the regenerator, I preferably make provisions for washing the regenerator with water from time to time. The provisions shown for this purpose comprise water spray heads S located in the chambers F⁵ of the different regenerator sections and each connected to water supply piping S' through an individual valved connection, so that the water may be separately sprayed into the upper end of each of the different regenerator sections. A drain pocket or hopper bottom F¹⁰ is provided at the lower end of each regenerator section and a valved drain pipe T is connected to the outlet from each drain pocket.

The use of cast iron as the material out of which the regenerative devices G are made, insures a high heat transfer rate between the incoming air and the devices G and between the latter and the outflowing heat gases, and thus minimizes the weight, and consequently the bulk and cost of the regenerator. The high heat transfer rate is augmented, moreover, by the relatively large amount of heat absorbing surface per unit of weight provided by the special shape given to the devices G. Keeping the heat absorbing surfaces clean, as is readily possible with the construction described, prevents the diminution in heat transfer rate which would occur if furnace dust were allowed to accumulate in the regenerator. When the devices G are made of cast iron, they can be washed with water as frequently as may be desirable without injury, provided the washing operation is carried on during a period in which air is passing through the particular regenerator section being washed. If the washing is carried on while the flue gases are passing through the section being washed, corrosion may result from the sulphur content of the flue gases. If desired, the air and gas valves may be locked in their closed positions during the washing operation as by means of pins inserted in holes A³⁰ (see Fig. 4) and holding the lever M in its intermediate position. The elliptical form of the parts G' and the vertical disposition of their major axes coupled with the fact that the webs G² extend from the top to the bottom of the parts G', which they connect, facilitates their thorough cleaning by the wash water.

The effect of making the disks G' of elliptical form and disposing them with their major axes parallel to the direction of air and gas flow is to increase the length of gas path and thereby increase the heat transfer rate of a regenerator of given weight and aggregate heat absorbing surface. For the most effective results, the aggregate heat absorbing area and the weight of the devices G should be properly proportioned relatively to one another and to the frequency of reversal and the amount of heat transferred from the flue gases to the air, so as to insure an adequate transfer of heat with apparatus which is desirably compact and light in weight, and sufficiently simple and reliable in operation from a practical standpoint, and which will not entail too heavy a draft loss in moving the air and gas through the regenerator, and which will avoid undesirable fluctuations in draft and in the temperature at which the pre-heated air is delivered to the furnace chamber. The aggregate weight of regenerative material required for a given heat transfer effect is inversely proportional to the temperature change in the regenerative material occurring between reversal periods, and is also inversely proportional to the period between reversals. I propose to make the period between reversals about as short as is possible with reversing mechanism of a relatively simple and reliable character, and in practice, contemplate a reversal period of something like two or three minutes.

The desirable maximum temperature change between reversals in the regenerative material is limited from a practical standpoint by the fact that the temperature at which the heating gases and the pre-heated air each leave the regenerator varies in approximate proportion to the temperature change produced in the regenerative material, particularly when the latter has such high heat conductivity as cast iron.

In practice, an increase in the temperature change in the regenerative material between reversals means an increase in the average temperature of exit of the heating gases, and thereby a lower thermal efficiency and a decrease in the average amount of preheat given to the air, as well as an undesirable increase in temperature variation in the air leaving the regenerator. With any particular shape which may be given to the regenerative devices G, those devices must have a sufficient aggregate heat absorbing surface to abstract the desired amount of heat from the heating gases and to impart it to the air to be heated. The form of the devices G should also be one which will minimize frictional resistance to gas flow through the regenerator. The practical effectiveness of the regenerator is enhanced also by the practical uniformity in thickness of the heat absorbing parts G', G², and G³ of the regenerative devices G which tends to uniformity in temperature and heat transfer rate. The special shape of the devices G illustrated lends itself to the proper relative proportions for any given installation, of the surface, area, and weight of the regenerative material, and gives a relatively low friction draft loss. Furthermore, the use of devices G of the particular form shown facilitates the calculations of the heat transfer rate and friction draft loss in a regenerator, necessary to the proper design of a regenerator for use under any particular set of operating conditions.

Those skilled in the art will understand that the main features of the present invention can be utilized in apparatus differing widely in form from that previously described, and in Figs. 10, 11 and 12 I have illustrated an arrangement differing from that previously described in the manner in which the reversing valves are constructed and operated. In Figs. 10, 11 and 12 the valves $i$, $ia$, $k$, and $ka$, corresponding to the valves I, IA, K and KA of the construction previously described, are each in the form of a flap valve hinge-connected at one edge to the regenerator housing through a corresponding hinge shaft $F^{20}$, which is horizontal and extends parallel to the length of the regenerator. The hinge shafts $F^{20}$ for the valves $ia$ and $ka$ at the top of each regenerator section, are located close to the longitudinal center of the regenerator at the upper end of the chamber $F^5$, and in its closed condition, each valve $ia$ and $ka$ is inclined outwardly and downwardly from its hinged edge, and each valve is swung outwardly and upwardly to open. Each valve $ia$ is opened and closed by means of a corresponding link member $I^{10}$, which extends through a slot $F^{21}$ in the top wall of the chamber $F^5$, and formed with a slot $I^{11}$ at its upper end which receives a crank pin $W'$ carried by a corresponding crank shaft W. As shown, each crank shaft W is provided with a crank pin $W'$ at each end and operates the two valves $ia$ for two adjacent regenerator sections, so that in a regenerator comprising eight sections, as illustrated in Fig. 10, there are four crank shafts W in alignment with one another. The four crank shafts W are gear-connected as by means of sprocket chains $W^2$ and co-operating sprocket wheels to a main reversing shaft X, which is continuously rotated at the desired speed by a motor (not shown). The eight crank pins $W'$ are angularly displaced with respect to one another about the common axis of the shafts W', so that as the shafts W make a single turn about their common axis, each of the valves $ia$ will make one complete opening and closing movement, and one of the valves $ia$ will reach its wide open position at the end of each angular movement of 45° of the shafts W. The slot $I^{11}$ in each link $I^{10}$ is of such a length that each valve $ia$ will be fully closed during approximately one-half of each revolution of the corresponding crank pin W'. The valves $ka$ are operated by the links $K^{10}$ similar to the links $I^{10}$ and each having a slot $K^{11}$ receiving the corresponding one of crank pins W' carried by a set of crank shafts WA similar to the crank shafts W, and driven in a similar manner from the main shaft X. The crank pins W' carried by the shafts W and WA are so relatively timed that neither of the two valves $ia$ and $ka$ for the same regenerator section will be open except when the other of the two valves is closed.

Each valve $i$ is operated through the corresponding valve $ia$ by connections comprising a link Y, pivoted to the valve $ia$, and to a vertical rack bar Y', a spur gear $Y^2$ journaled on the regenerator housing and in mesh with the bar Y', and a second rack bar $Y^3$ in mesh with the gear $Y^2$ and connected by a link $Y^4$ to the valve $i$. A weight $Y^5$ secured to the lower end of each rack bar Y' gives the corresponding valves $i$ and $ia$ a tendency to move into their closed positions. Connections similar to those just described are provided for operating each valve $k$ through the corresponding valve $ka$.

The rack bars Y' and $Y^3$ have smooth portions mounted in guide casings $F^{22}$, secured to the regenerator housing and acting like stuffing boxes, to prevent appreciable leakage along the rack bars into or out of the chambers $F^5$ and $F^2$. Casing parts $F^{23}$ mounted on top of the regenerator housing, enclose the upper ends of the links $I^{10}$ and $K^{10}$ and the crank connections thereto, thereby preventing objectionable leakage through the slots $F^{21}$.

The hinge shafts $F^{20}$ for each co-operating pair of valves $i$ and $k$, are located near the bottom of the corresponding chamber $F^2$, so that in their closed positions each of these valves is inclined upwardly and outwardly from its hinged axis, and each valve swings outwardly and downwardly in opening. In their closed positions, each pair of valves $i$ and $k$ co-operate to deflect the wash water, in the regenerator washing operation, into a corresponding outlet $T^{10}$, which may be connected to suitable drain piping, such as the piping T shown in Fig. 2. To permit of the valves for the different regenerator sections being held in their closed positions during the washing operation, a clutch X' (shown diagrammatically in Fig. 10) may be provided for connecting and disconnecting each of the shafts W and WA from the shaft X. When any shaft W or WA is thus disconnected from the shaft X, the corresponding valves $i$, $k$, $ia$, and $ka$ are closed by the corresponding weight $Y^5$. With provisions for separately connecting and disconnecting the various shafts W and WA from the valve operating mechanism, it is possible to hold all four of the valves for each regenerator section in their closed position during the washing operation proper, and then to open the valves to permit the flow of air through the regenerator so as to thoroughly dry the regenerator before the sulphur-containing flue gases are again passed through the section. It will be understood that in ordinary practice the regenerator sections are operated during light load periods, when any reduction in regenerator capacity as a result of the washing operation is of small importance.

With a regenerator comprising eight sections, for example, and having the valve actuating mechanism shown in Figs. 10, 11 and 12, flue gases will normally pass downward through the other four sections, except at the instants in which the flow is being reversed through one or another of the different regenerator sections. At the instant at which the up-flow of flue gases through any particular regenerator section is interrupted in a flow reversal operation, and before the down-flow of air through that regenerator starts, air will pass downward through only three regenerator sections, and of the three sections through which air is flowing downward, the valves $k$ and $ka$ for one section will be wide open and for the other two sections will be approximately half way open. This condition is the one giving the maximum draft resistance to the down-flow of air through the regenerator, and this resistance diminishes as soon as the air begins to flow through the regenerator in which reversal of flow is being effected. It is to be understood, however, that the variation in draft resistance is not proportional to the degree of opening of the partially open valves, since the bulk of the resistance to flow through a regenerator section having its valves part way open, is not due to the throttling action of the valves but to the restriction and tortuous shape of the gas passages through the mass of regenerative devices G. Furthermore, the retardation of the volume of flow through a regenerator section during the periods immediately preceding and following flow reversal has a compensating advantage in that it tends to increase the temperature change produced by the regenerative section in the air or flue gases then passing through it.

This increase in efficiency is at some expense to the capacity of the apparatus, which must be larger for a given duty with the valve arrangement of Figs. 10, 11 and 12, than is required with the quick opening and closing valves of the arrangement shown in Figs. 1–6.

In the arrangement shown in Figs. 13, 14 and 15, communication between each of the conduits A', B, D' and E and each regenerator section is controlled by a corresponding rotary valve Z', working in a corresponding valve casing Z, secured to or forming part of the regenerator housing. The various flue gas inlet valves Z' are each carried by a single shaft W, and each of the other three sets of valves Z' are carried by corresponding shafts W. The four valve shafts W are continuously rotated as by gearing $X^{10}$, connecting them to a common driving shaft XA at one end of the regenerator. The chamber in which each valve Z' works is formed with curved walls $Z^{11}$, against which the outer edges of the valve Z' engage during the periods in which the valve prevents flow through the chamber. The two air flow controlling valves Z' at the top and bottom of each regenerator section engage and move away from the surfaces $Z^{11}$ at the same time, and this is true of the two flue gas controlling valves for the section. The air and flue gas controlling valves Z' for each section are so set on their shafts W and the curved surfaces $Z^{11}$ are of such extent, that each air flow controlling valve Z' closes immediately before the corresponding flue gas controlling valve opens, and vice versa. To restrict leakage, each valve Z' is provided at its marginal edges with flexible strips $Z^2$ of asbestos board or the like, which sweep the surfaces $Z^{11}$ and the sides of the partition walls $Z^{10}$ between the aligned valve chambers. Leakage through the openings in the partition walls $Z^{10}$ through which the valve shafts W extend, is restricted by providing the wall $Z^{10}$ with hub-like bosses forming elongated bearings for the shafts W.

To close communication between the bottom chamber $F^2$ of each regenerator section and the conduits A' and E during the washing operation, I employ removable damper slides ZA, one of which is shown in place at the right-hand side of Fig. 14. Each slide damper ZA, when in place, extends across the corresponding valve chamber with its side edges received in guide-ways formed in the construction illustrated, by guide ribs $Z^{13}$ on the partition walls $Z^{10}$ and guide strips $Z^{14}$ bolted to the walls $Z^{10}$. The damper slides ZA are downwardly inclined so as to deflect the wash water to the drainage outlet $T^{10}$, and the guide strips $Z^{14}$ are shaped to form gutters which collect any water leaking past the side edges of the damper slides and pass the water so collected to the drainage outlet $T^{10}$. The lower edges of the damper slides, when in place, rest on surfaces $Z^{15}$. Each damper slide is advantageously provided with a head portion at its outer edge which closes the kerf $Z^{16}$, through which the damper slide is inserted or removed. When each damper slide ZA is removed, the corresponding kerf $Z^{16}$ is closed as by means of a closing device ZB, shown in place at the left-hand side of Fig. 14.

With the described construction, each regenerator section may be washed whenever desirable without regard to the position of the corresponding valves Z' and without interrupting their operation. The arrangement of valves Z' and the surfaces $Z^{11}$ is such that a small angular movement of the valve away from its closed position gives a valve opening sufficient for substantially full air or gas flow. The valves may advantageously be shaped to give a stream-like effect and thus minimize the resistance to air and gas flow when the valves are out of their closed positions. The valves Z' for the different regenerator sections may be set to open and close in the desired sequential order.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. The combination with a regenerator divided into a multiplicity of sections among one plurality of which the flow of the fluid heated at any one time is normally divided and among another plurality of which the flow of the fluid cooled at the same time is normally divided, of means comprising valve actuating mechanism for reversing the flow through the different sections of each such plurality at different times.

2. The combination with a regenerator divided into a multiplicity of sections among one plurality of which the flow of the fluid heated at any one time is normally divided and among another plurality of which the flow of the fluid cooled at the same time is normally divided, of means comprising valve actuating mechanism for reversing the flow through the different sections of each such plurality successively in regular sequence.

3. The combination with a boiler furnace of an air preheater therefor comprising a plurality of regenerator chambers among a plurality of which the furnace flue gas flows at any one time is normally divided and among another plurality of which the flow of air supplied to the furnace at the same time to support combustion therein is normally divided, of flow reversing provisions adapted to reverse the flow through the different chambers of each such plurality at different times.

4. The combination with a regenerator divided into a plurality of pairs of sections, of flow reversing means normally maintaining a flow of the fluid to be heated through one section and the flow of the heating fluid through the other section of each pair, and reversing the flow through the sections of the different pairs in regular succession.

5. As a new article of manufacture, an elongated metallic heat regenerator element comprising parallel spaced apart disk-like parts distributed along the length of the element and integral connecting portions.

6. As a new article of manufacture, an elongated metallic heat regenerator element comprising parallel spaced apart disk-like parts distributed along the length of the element, and integral connecting portions of web-like form extending diametrically of said parts.

7. As a new article of manufacture, an elongated metallic heat regenerator element comprising parallel spaced apart disk-like parts of elliptical form with their major axes parallel, and integral connecting parts.

8. As a new article of manufacture, an elongated metallic heat regenerator element comprising parallel spaced apart disk-like parts of elliptical form with their major axes parallel, and integral connecting parts extending diametrically of the disk-like parts and parallel to their major axes.

9. As a new article of manufacture, an elongated heat regenerator element comprising parallel spaced apart disk-like parts and spacing parts distributed along the length of the element and integral connecting parts, said spacing parts being adapted to co-operate with the corresponding spacing parts of other similar elements to form a stable stack of such elements with a plurality of elements in each of a plurality of horizontal rows.

10. In a regenerator, a regenerative mass comprising a stack of similar elements, each of which consists of a plurality of parallel disk-like parts of elliptical outline with their major axes vertically disposed and rectangular spacing parts distributed along the length of each element, and vertical web portions connecting the adjacent disk-like and spacing parts and each approximately equal in vertical length to the major axes of said disk-like parts, the spacing parts of the various elements co-operating to give the stack stability when the elements thereof are arranged in horizontal rows with the elements in adjacent horizontal rows staggered with respect to one another.

Signed at New York city, in the county of New York, and State of New York, this 22nd day of January, A. D. 1924.

JOHN E. BELL.